Nov. 6, 1923.　　　　　　　　　　　　　　　　　1,473,487
E. F. McCARTHY
HYDRAULIC CLUTCH FOR TRANSMITTING ROTATIVE MOTION FROM A DRIVEN SHAFT
TO A DRIVING SHAFT
Filed Feb. 27, 1920
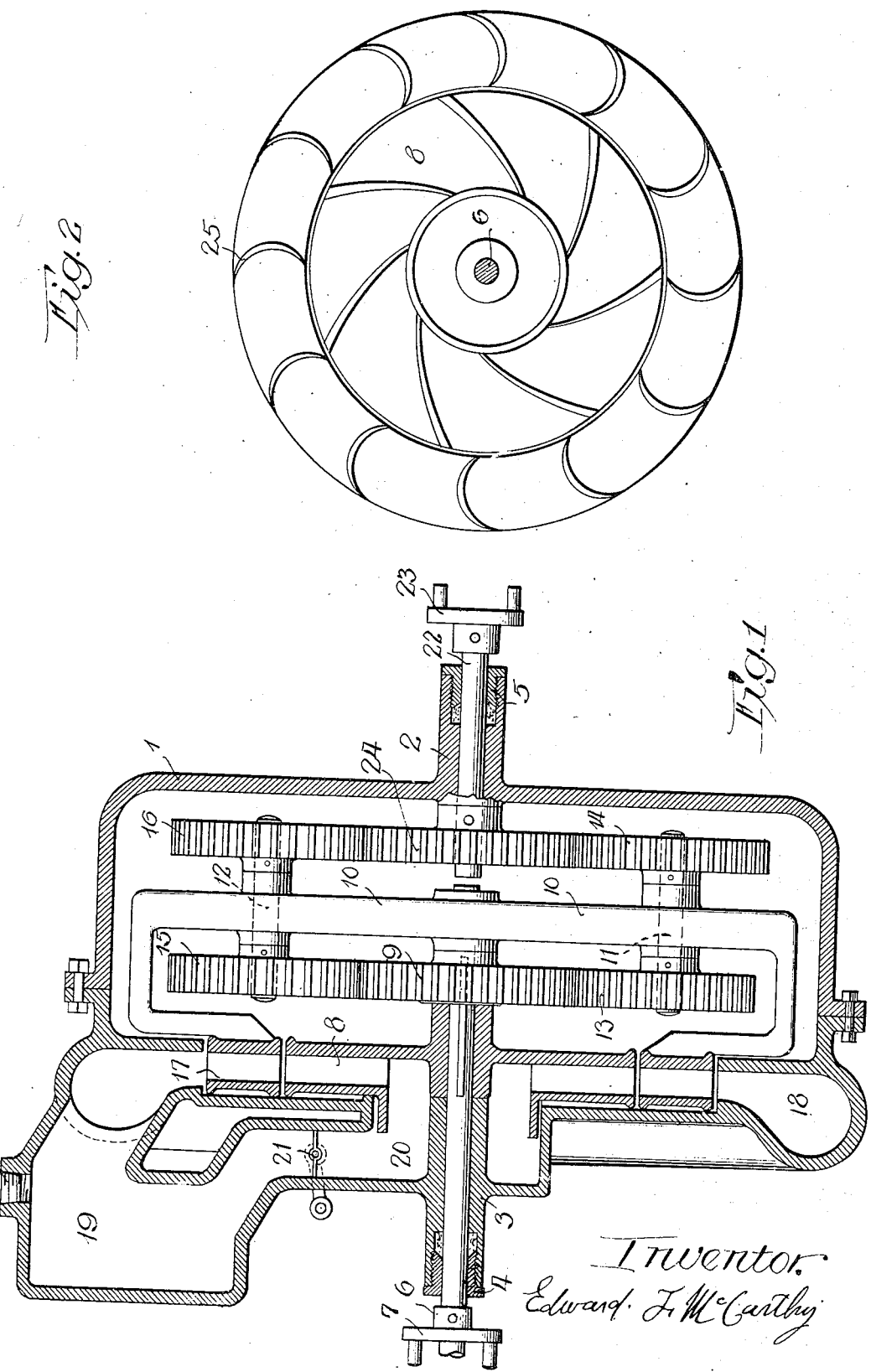
Inventor.
Edward F. McCarthy Patented Nov. 6, 1923.

1,473,487

UNITED STATES PATENT OFFICE.

EDWARD F. McCARTHY, OF CHICAGO, ILLINOIS.

HYDRAULIC CLUTCH FOR TRANSMITTING ROTATIVE MOTION FROM A DRIVEN SHAFT TO A DRIVING SHAFT.

Application filed February 27, 1920. Serial No. 361,708.

*To all whom it may concern:*

Be it known that I, EDWARD F. MC-CARTHY, a citizen of the United States, residing at Chicago, in the county of Cook and State of Illinois, have invented new and useful Improvements in a Hydraulic Clutch for Transmitting Rotative Motion from a Driven Shaft to a Driving Shaft, of which the following is a specification.

This invention relates to improvements in hydraulic clutches in which a liquid is the power transmitting medium and one of the objects of this invention is to provide an improved device of this character particularly adapted though not necessarily limited in its use for regulating the speed of automobiles, motor boats, and the like and has for one of its objects to dispense with the usual clutch and gear set.

The invention is hereinafter more fully described and shown in the accompanying drawings in which similar numerals refer to similar parts:

Figure 1 is a vertical sectional view.

Figure 2 is a detail elevation of the impeller and rotative element.

Fig. 1 shows the complete unit in which "1" is a housing provided with bearings "2" and "3" and stuffing boxes "4" and "5"; "6" is a shaft provided with coupling "7" and this shaft supports inner impeller "8," a gear "9" and a yoke or double arm member "10" the impeller "8" and gear "9" are fixed rigidly to shaft "6" while the arm "10" is free on said shaft. The arm or yoke "10" is provided with bearings which support shafts "11" and "12" on which shafts are respectively fixed gears "13," "14," "15" and "16," the gears "13" and "15" meshing with the gear "9." The yoke or arm member "10" also supports an outer rotative element "17"; which latter circumscribes the impeller "8" and fits snugly between the impeller "8" and a volute "18." The volute "18" communicates with a chamber "19," the latter having a passageway leading to an intake chamber "20," and a valve 21 is provided for controlling the passageway.

A shaft "22" is also provided and supports a coupling "23" on one end and a gear "24" on the other, the gear 24 meshing with gears "14" and "16."

Fig. 2 is a section taken through line "A" of Figure "1" and shows the impeller "8" and the outer concentric rotative element "17" the latter being provided with buckets "25."

The operation of the machine is as follows: A liquid is poured into chamber "19" through plug hole "26" until chamber is about half full the valve "21" being closed so that no liquid can pass through passageway into chamber "20." Rotative motion is now imparted to shaft "6" in any suitable manner which sets the impeller "8" and gear "9" in motion. As no liquid is being discharged from the impeller "8" when the valve "21" is closed, no retarding action is being manifested against the buckets "25" in rotative element "17" and if a load should be applied to shaft "22" through the medium of coupling "23" the gear "9" setting the gears "13" and "15" in motion, which in turn set the gears "14" and "16" in motion, will cause the gears "14" and "16" to travel around gear "24." This will cause the outer rotative element "17" to be set in a direction of motion opposite to the direction of rotation of the impeller "8." If the valve "21" is now opened, to permit liquid to pass into the impeller "8," this liquid on being discharged from impeller "8" against buckets "25" in the rotative element "17" has a retarding effect on the said element "17" and causes it to slow up, thereby causing the gear "24" to rotate and it is obvious that if the yoke or arm "10" and rotative element "17" could be held at rest, the gear "24" would revolve at the same speed as the shaft "6" or in ratio to the gearing arrangement.

As will be seen the device is practical, simple and should last a long time under hard usage, as oil would probably be the power transmitting medium which would keep the moving parts well lubricated.

Furthermore it will be noted that there is a continuous circulation of the liquid from the chamber 19 through the passage 20 back to the intake of the impeller 8 to be again discharged from the impeller 8 against or into the buckets 25 of the outer rotative element 17 to be discharged from the latter back into the chamber, thus preventing any waste or loss of the liquid.

What I claim as new, is:

1. A device of the character described embodying a rotative element adapted to pick up and discharge liquid, an outer element circumscribing the first mentioned element, and a plurality of gears arranged so as to set the aforesaid elements in opposite directions of rotation when a rotative motion is imparted to the first mentioned rotative element, the said liquid circulating from the outer element to the first recited element.

2. A device of the character described embodying a rotative element adapted to pick up and discharge liquid, an outer element circumscribing the aforesaid element and embodying buckets into which the liquid from the first mentioned element is discharged, a plurality of gears adapted to be set in motion by the same means that set the first rotative element in motion and arranged so that when one of said gears is held at rest it will cause the outer rotative element to be set in a direction of motion opposite to that in which the first mentioned rotative element is moving, and means whereby the liquid will have a clearly defined path of circulation from the second recited element back to the first recited element.

3. A device of the character described embodying an inner rotative element adapted to pick up and discharge liquid, an outer rotative element circumscribing the aforesaid element and adapted to receive liquid discharged by the first mentioned rotative element, means for controlling the supply of liquid to the first mentioned rotative element, a plurality of gears set in motion by the same means that sets the first mentioned rotative element in motion and arranged so that when one of said gears is held at rest, it will cause the outer rotative element to be set in a direction of motion opposite to the direction in which first mentioned rotative element is moving, and means whereby when liquid is discharged from the first mentioned rotative element into the outer rotative element it will tend to prevent the outer rotative element from revolving for causing the aforesaid gear to revolve.

4. A device of the character described embodying an inner rotative element adapted to pick up and discharge liquid, an outer rotative element adapted to receive liquid discharged by the aforesaid inner rotative element, means for controlling the supply of liquid to the inner rotative element, a plurality of gears adapted to be set in motion by the same means that set the said inner rotative element in motion, and means whereby when no liquid is being discharged from the inner rotative element into the outer rotative element one of said gears will be at rest and the outer rotative element will move in a direction opposite to the direction of movement of the inner rotative element, and means whereby when liquid is discharged from the inner rotative element into outer rotative element, the aforesaid gear will revolve.

5. A device of the character described embodying a rotative element adapted to pick up and discharge liquid, an outer rotative element concentric therewith, a plurality of gears arranged to set the said elements in opposite directions of rotation when rotative motion is imparted to the first said element, and means for controlling the supply of liquid to the first said element.

6. A device of the character described embodying a rotative element adapted to pick up and discharge liquid, an outer rotative element concentric therewith, a plurality of gears arranged to set the said elements in opposite directions of rotation when rotative motion is imparted to the first said element, means for controlling the supply of liquid to the first said element, and means whereby the liquid delivered from the first recited element will retard the rotation of the second recited element for causing certain of said gears to revolve.

7. A device of the character described embodying a rotative element adapted to pick up and discharge liquid, an outer rotative element concentric therewith, a plurality of gears arranged to set the said elements in opposite directions of rotation when rotative motion is imparted to the first said element, means whereby the liquid delivered from the first recited element will retard the rotation of the second recited element for causing certain of said gears to revolve, and means whereby the liquid discharged from the second recited element will be delivered back to the intake of the first recited element.

8. A device of the character described embodying a rotative element adapted to pick up and discharge liquid, an outer rotative element concentric therewith, a plurality of gears arranged to set the said elements in opposite directions of rotation when rotative motion is imparted to the first said element, means whereby the liquid delivered from the first recited element will retard the rotation of the second recited element for causing certain of said gears to revolve, means whereby the liquid discharged from the second recited element will be delivered back to the intake of the first recited element, and means for controlling at will the circulation of the liquid back to the first recited element.

EDWARD F. McCARTHY.